US008063669B2

(12) United States Patent
Lindfors et al.

(10) Patent No.: US 8,063,669 B2
(45) Date of Patent: Nov. 22, 2011

(54) FREQUENCY SYNTHESIZER HAVING A PLURALITY OF INDEPENDENT OUTPUT TONES

(75) Inventors: Saska Lindfors, Espoo (FI); Kari Stadius, Helsinki (FI); Liangge Xu, Espoo (FI); Tapio Rapinoja, Kerava (FI); Jussi Ryynanen, Vantaa (FI); Risto H. S. Kaunisto, Espoo (FI); Aarno Parssinen, Espoo (FI)

(73) Assignee: Nokia Corporation, Espoo (FI)

( * ) Notice: Subject to any disclaimer, the term of this patent is extended or adjusted under 35 U.S.C. 154(b) by 180 days.

(21) Appl. No.: 12/291,255

(22) Filed: Nov. 6, 2008

(65) Prior Publication Data
US 2010/0109714 A1 May 6, 2010

(51) Int. Cl.
*H03B 21/00* (2006.01)
(52) U.S. Cl. ........... 327/105; 327/106; 327/107; 331/23
(58) Field of Classification Search ................. 327/105, 327/106, 107; 331/23
See application file for complete search history.

(56) References Cited

U.S. PATENT DOCUMENTS

| 4,984,186 A | 1/1991 | Moerder ................... 364/721 |
| 5,563,535 A * | 10/1996 | Corry et al. ................. 327/105 |
| 2003/0119465 A1 | 6/2003 | Martin et al. ............... 455/260 |
| 2005/0117071 A1 * | 6/2005 | Johnson ...................... 348/729 |
| 2005/0266818 A1 | 12/2005 | Johnson et al. ............. 455/260 |
| 2008/0285698 A1 | 11/2008 | Mallinson .................... 375/376 |
| 2009/0015296 A1 | 1/2009 | Chen et al. .................. 327/105 |

OTHER PUBLICATIONS

"A High-Resolution DLL-Based Digital-To-Time Converter for DDS Applications" 2002 IEEE International Frequency Control Symposium and PDA Exhibition; F. Baronti et al, pp. 649-653.
"Alternative Wideband Front-End Architectures for Multi-Standard Software Radios" 2004 IEEE, Mehmet R. Yuce et al. Sep. 26-29, 2004, vol. 3, sid. 1968-1972.
"A Digital Frequency Synthesizer for Cognitive Radio Spectrum Sensing Applications", Tapio Rapinoja, et al., IEEE Radio Frequency Integrated Circuits Symposium, 2009, p. 423-426.
"A Direct Digital Period Synthesis Circuit", Dorin Emil Calbaza et al., IEEE Journal of Solid-State Circuits, vol. 37, No. 8, Aug. 2002, pp. 1039-1045.

* cited by examiner

*Primary Examiner* — Lincoln Donovan
*Assistant Examiner* — John Poos
(74) *Attorney, Agent, or Firm* — Harrington & Smith

(57) ABSTRACT

Described is an apparatus that includes a frequency source and a plurality of time domain direct digital synthesizers each having an input connected to an output of the frequency source and an output providing an output frequency signal. A particular time domain direct digital synthesizer includes a sigma-delta modulator that functions as a second order multi-stage noise shaping sigma-delta modulator. In one exemplary embodiment sigma-delta modulator outputs provide a unitary-weighted word used to switch certain unit capacitors that comprise part of a delay modulator to produce a time-varying delay having a time-averaged value that directly corresponds to a binary value appearing on a plurality of phase accumulator outputs.

35 Claims, 9 Drawing Sheets

FREQUENCY SYNTHESIZER HAVING A PLURALITY OF INDEPENDENT OUTPUT TONES

TECHNICAL FIELD

The exemplary and non-limiting embodiments of this invention relate generally to radio circuitry, integrated circuits, local oscillator (LO) signal generation and wireless communication systems, and more specifically relate to frequency synthesizers used for, as non-limiting examples, software defined radios and cognitive radios.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

Certain abbreviations that may appear in the following text and/or drawing figures are defined as follows:
  DDS direct digital synthesizer
  TD-DDS time domain direct digital synthesizer
  DDPS direct digital period synthesizer (synthesis)
  PLL phase-locked loop
  DTC digital-to-time converter
  SDM sigma-delta modulator
  SDDM signal-delta digital modulator
  FC frequency converter
  LO local oscillator
  DM delay modulator
  DLL delay locked loop (delay line)
  MASH multi-stage noise shaping Software defined radios and concurrent radios can simultaneously employ multiple independent LO signals. This assumption is also valid for those radio systems that may split a transmission into multiple different frequency bands in a flexible spectrum allocation scheme. Future cognitive radio systems may be examples of such subsystems.

General reference may be had to FIGS. 1A and 1B, where FIG. 1A shows an exemplary three frequency bands each having a different number of channels ($Ch_x$), where certain of the channels are cognitive radio reception channels, and where FIG. 1B shows an exemplary number of channels associated with different radio standards, where certain ones of the channels are multiradio reception channels.

The existing frequency synthesizer approaches known to the inventors are inefficient or even unfeasible to implement in a practical system, when it is desired to create a set of independent LO tones that cover a wide frequency range to facilitate, for example, the implementation of multiple radio standards.

A single PLL-based frequency synthesizer can generate only one independent LO tone at any time. Frequency multipliers, dividers and single sideband mixers may be used to extend the output frequency range and to output several tones. However, the output tones are interdependent since they are generated from the same original source. As a result, in order to generate N independent LO tones N parallel PLL units are required. Unfortunately a set of parallel PLLs requires a large amount of integrated circuit die area (e.g., silicon die area), and as a result will typically not be economically feasible to implement. In addition, practical issues such as interference and coupling problems may emerge, rendering the resultant circuitry unsuitable for use in many important applications.

SUMMARY

The foregoing and other problems are overcome, and other advantages are realized, by the use of the exemplary embodiments of this invention.

In a first aspect thereof the exemplary embodiments of this invention provide an apparatus that comprises a frequency source and a plurality of time domain direct digital synthesizers each having an input connected to an output of the frequency source and an output providing an output frequency signal.

In another aspect thereof the exemplary embodiments of this invention provide an apparatus that comprises a transition generator having an input configured to receive an output of a frequency source and a plurality of outputs; a transition selector connected with said plurality of outputs of said transition generator for selecting one generated transition of said output of said frequency source, said transition selector having an output providing a first frequency signal; a delay modulator having an input connected to said output of said transition selector for controllably delaying said first frequency signal and having an output providing a final output frequency signal; a phase accumulator having a plurality of inputs configured to receive a plurality of control signals and a plurality of outputs; a decoder having an input coupled to some of said plurality of outputs of said phase accumulator and an output connected with said transition selector for specifying the selected one generated transition; and a sigma-delta modulator having a plurality of inputs connected to others of said plurality of phase accumulator outputs and a plurality of outputs connected, in combination with still others of said plurality of phase accumulator outputs, to said delay modulator for specifying an amount of delay experienced by said final output signal.

In a further aspect thereof the exemplary embodiments of this invention provide an apparatus that comprises a transition generator having an input configured to receive an output of a frequency source and a plurality of outputs; a transition selector connected with said plurality of outputs of said transition generator for selecting one generated transition of said output of said frequency source, said transition selector having an output providing a final frequency signal; a phase accumulator having a plurality of inputs configured to receive a plurality of control signals and a plurality of outputs; a sigma-delta modulator having a plurality of inputs connected to said plurality of outputs of said phase accumulator and a plurality of outputs; and a decoder having an input connected to said plurality of outputs of said sigma-delta modulator and an output connected with said transition selector for specifying the selected one generated transition.

In a still further aspect thereof the exemplary embodiments of this invention provide a method that comprises simultaneously generating from a single reference signal a plurality of local oscillator signals with a corresponding plurality of time domain direct digital synthesizers; and using individual ones of said plurality of local oscillator signals for at least one of simultaneously downconverting and upconverting a plurality of frequency signals.

In yet another aspect thereof the exemplary embodiments of this invention provide an apparatus that comprises means for simultaneously generating from a single reference signal a plurality of local oscillator signals with a corresponding plurality of time domain direct digital synthesizers each comprising a second order multi-stage noise shaping sigma-delta modulator. The apparatus further comprises means for mixing individual ones of said plurality of local oscillator signals for at least one of simultaneously downconverting and upconverting a plurality of frequency signals.

DETAILED DESCRIPTION

The exemplary embodiments of this invention provide a DLL-based circuit technique for generating a precisely defined frequency shift between an input frequency and an output frequency. The DLL-based circuit is capable of producing an output frequency higher than the input frequency, and a frequency increment may be freely set. The DLL-based circuit may be referred to for convenience, and not by way of limitation, as a time-domain direct digital synthesizer (TD-DDS). It should be noted at the outset that the TD-DDS is functionally not equivalent to a conventional direct digital frequency synthesizer.

Figure 2:
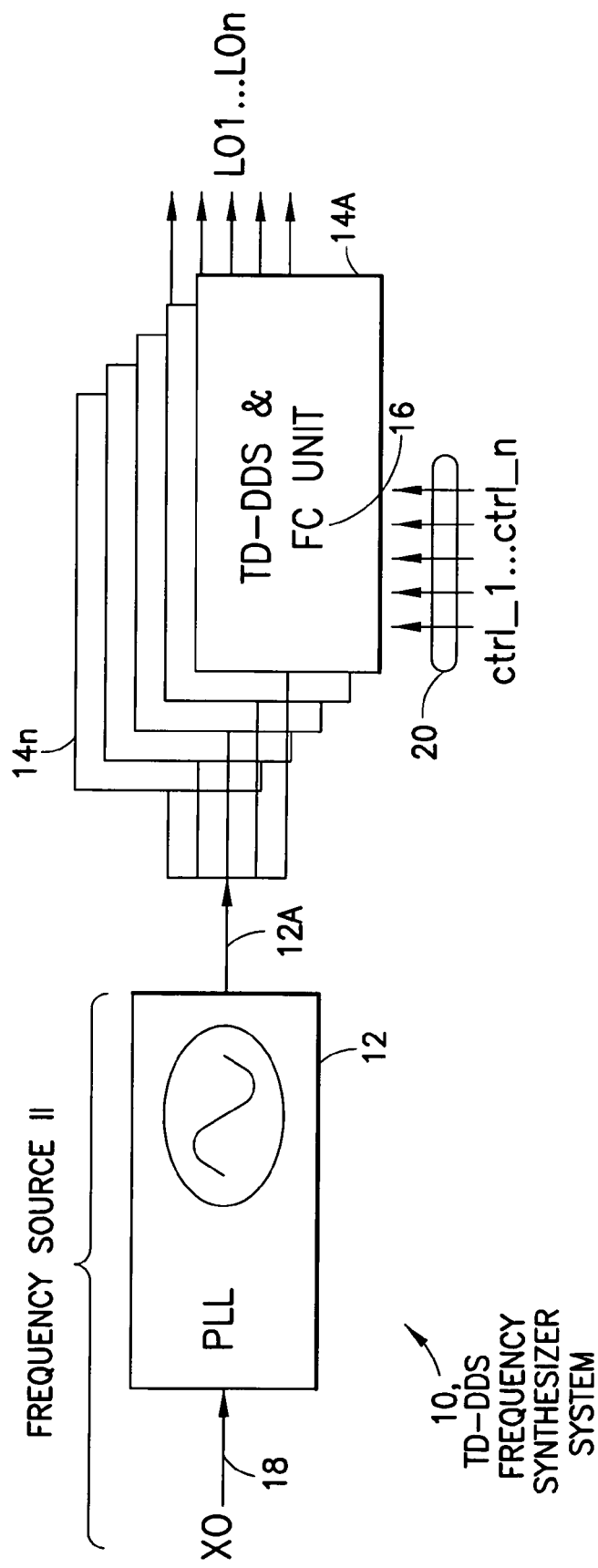
FIG. 2 is a block diagram of a TD-DDS frequency synthesizer system that is capable of simultaneously generating multiple independent LO frequencies in accordance with the exemplary embodiments of this invention.

FIG. 2 is a block diagram of a TD-DDS frequency synthesizer system 10 in accordance with exemplary embodiments of this invention. A single (possibly) conventional PLL 12 is used to generate an appropriate reference frequency or tone 12A. A bank or set of n parallel TD-DDS units 14A, 14B, . . . 14$_n$ (collectively referred to herein as TD-DDS 14) are used to independently convert the reference tone 12A into n desired LO tones. Furthermore, each TD-DDS unit 14 can be succeeded by an optional frequency converter (FC) unit 16 that may multiply or divide the generated frequency, and thus expand the total achievable frequency range. The TD-DDS frequency synthesizer system 10 employs a single input reference signal 18 for the PLL 12, such as one provided by a crystal or other type of oscillator) and a set of digital control words 20 for each TD-DDS unit 14 so as to digitally set the desired output frequency. The input reference frequency signal 18 (and its generator) and the PLL 12 may be collectively considered to be a frequency source 11.

The PLL 12 may be any suitable type of PLL device, such as a conventional integer-N PLL implemented using well-known circuits. The FC unit(s) 16 may also be based on any suitable type of well-known circuit architectures that may provide multiplication or division of the input frequency (or they may simply provide a passthrough of the input and may simply buffer or amplify the input).

The use of the TD-DDS frequency synthesizer system 10 is attractive for transmission and/or reception operations using multiple frequency bands. This is due at least to the fact that clock drift of the PLL 12 correlates between sources and thus facilitates the detection of multiple frequency bands.

The exemplary embodiments of this invention allow the creation of multiple independent LO tones from the single PLL 12. The TD-DDS frequency synthesizer system 10 may be implemented using, for example, standard (e.g., 0.25 micron) CMOS technology and requires but a relatively small die area. The TD-DDS frequency synthesizer system 10 provides LO signal generation for software defined and concurrent radios, as well as for advanced cognitive radios using multiple frequency bands (as non-limiting examples of possible implementations and application areas), and provides an efficient implementation of flexible spectrum usage schemes in radio communications.

These exemplary embodiments are now described in further detail, in particular non-limiting embodiments of the TD-DDS 14.

In one non-limiting embodiment, by the use of a DDPS architecture proposed in the literature (see Dorin E. Calbaza, Yvon Savaria, "A Direct Digital Period Synthesis Circuit", IEEE Journal of Solid-State Circuits, Vol. 37, No. 8, August 2002, pgs. 1039-1045), the TD-DDS system 10 is capable of producing relatively high frequencies. As was noted above, one advantage of the TD-DDS is its full compatibility with a conventional digital CMOS process. Moreover, it avoids the use of parallel PLLs and thus potentially lowers hardware cost.

However, one issue that arises from the use of the TD-DDS for frequency synthesis is the relatively high level of spurs in its output spectrum due to truncation of a phase accumulator output. On one hand, the truncation is typically inevitable due to the limited time resolution of a reliable delay element that can be realized in a real process, and on the other hand, it is necessary to reduce the hardware complexity. The truncation causes timing errors in the DDS output transition edges. These timing errors are deterministic, and their periodic components give rise to spurs in the DDS output spectrum.

In the Calbaza et al. journal article there was proposed a DDPS architecture that allows the circuit output frequency to be higher than the reference frequency. As described, a delay modulator, which takes additional bits from the phase accumulator output, is used to reduce the timing jitter level and thus the magnitude of spurs in the output. Though the use of the delay modulator at least partially alleviates the spur problem, the phase truncation is still necessary due to the hardware limitations of the delay modulator itself. As such, a technique that can further improve the TD-DDS output spectrum is highly desirable.

Figure 3:
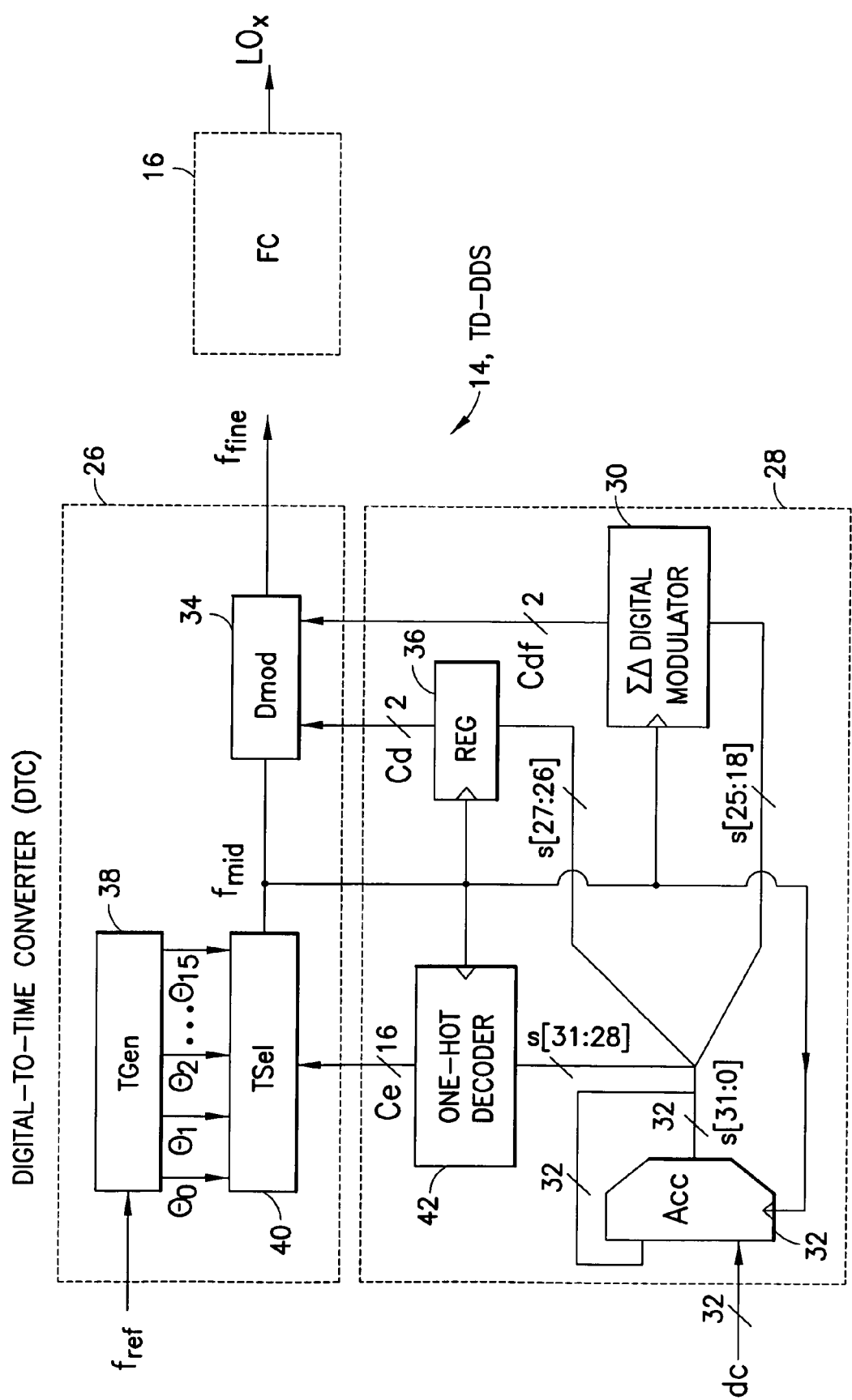
FIG. 3 is a block diagram of a TD-DDS with a SDDM further in accordance with the exemplary embodiments of this invention.
Figure 4:
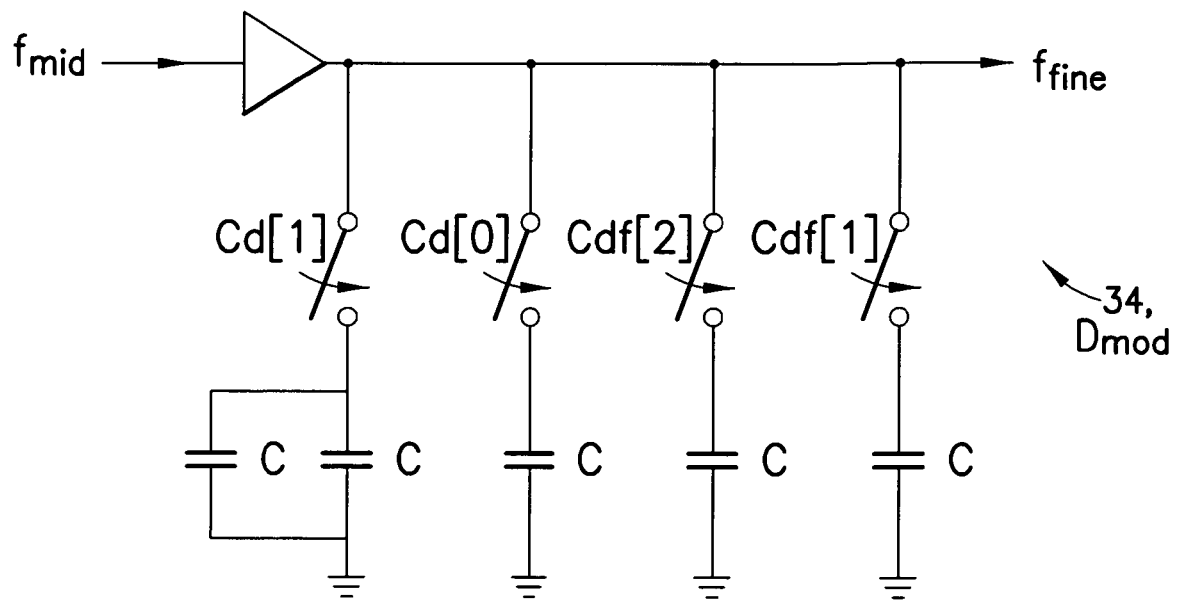
FIG. 4 shows the principle of a DM (Dmod).
Figure 9A:
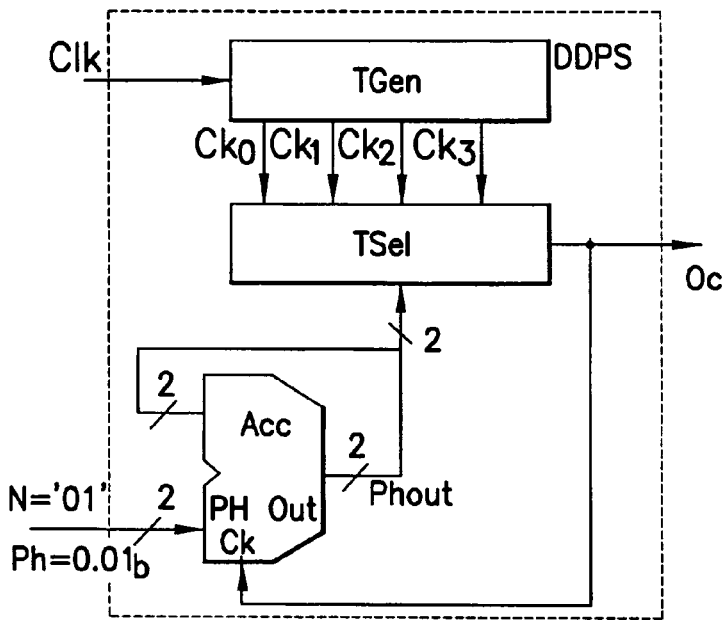
FIGS. 9A, 9B and 9C are circuit diagrams and a timing diagram of a conventional direct digital period synthesis circuit, said Figures being useful in gaining an understanding of the benefits made possible by the use of certain exemplary embodiments of this invention.
Figure 9B:
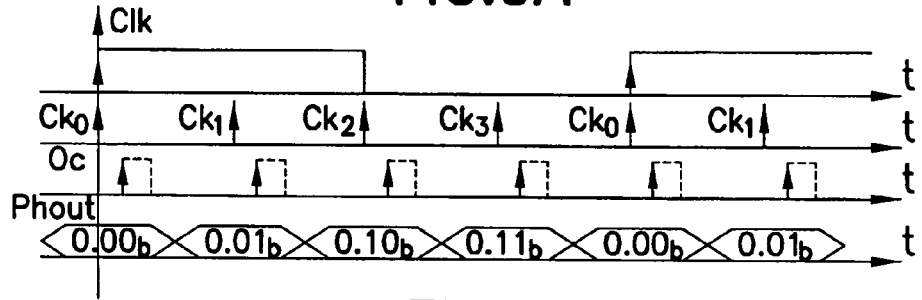
Figure 9C:
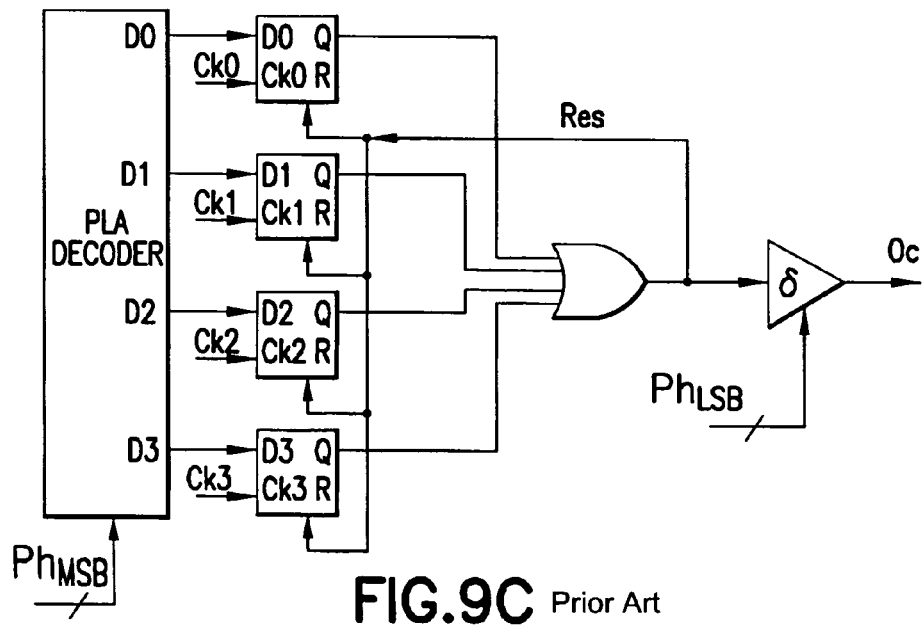

FIGS. 9A, 9B and 9C are circuit diagrams and a timing diagram of the conventional direct digital period synthesis circuit proposed by Calbaza et al., and reproduce FIGS. 2, 3 and 4 of the Calbaza et al. publication. These Figures are useful in gaining an understanding of the benefits made possible by the use of certain exemplary embodiments of this invention.

As is stated in the Calbaza et al. publication, the DDPS can multiply a reference clock frequency with a fractional number. FIGS. 9A and 9B, respectively, present the general block diagram and the timing diagram of the DDPS circuit. Shown in FIG. 9A is a transition generator (TGen), which produces several output signals at the same frequency as the input reference clock (Clk), but with evenly distributed phases. A transition selector circuit (TSel) is responsible for selecting one of the transitions provided by the TGen. This transition is propagated to an output clock (Oc). Transition selection is done according to the output produced by a phase accumulator (Acc). The ability to select the transition that propagates to the output clock allows the DDPS to numerically control its output period. In contradistinction, a conventional DLL-based frequency multiplier propagates transitions in their natural order and its output period is fixed.

The TGen circuit was implemented by using a differential ring oscillator composed of 32 differential buffers/inverters, connected as a ring oscillator. For instance, with a 3.2-ns ring oscillator period, the TGen can produce 64 derived copies of the clock with transitions delayed by 50 ps from each other. In this case, only the 6 most significant bits (MSBs) of the Acc output are used to select one of the 64 transitions. The propagated transition is also used to control the phase increment. To simplify the block diagram, the TSel was limited to four phases, $Ck_0$ to $Ck_3$, produced by the transition generator and selected according to the output of a 2-bit phase accumulator. Assuming a 3.2-ns period input-clock, $Ck_0$ to $Ck_3$ are delayed from each other by 800 ps. By using Oc to control the phase Acc, its period can be made equal to a fraction of the Clk clock period (T), where the fraction is specified by the phase increment Ph.

The timing diagram of FIG. 9B presents the case for Ph=$0.01_b$, which is the binary representation of ¼. In response to clock pulses driving the Acc clock, the output phase goes from $0.00_b$ to $0.01_b$, $0.10_b$, $0.11_b$, and then the sequence repeats.

For example, assume that the circuit starts with an output phase equal to $0.00_b$. This selects $Ck_0$ to be propagated at the output Oc. After a propagation delay that particular transition will generate a pulse on Oc. That pulse will trigger the update of the Acc content that will become $0.01_b$, thus the next output phase becomes $0.01_b$, which will select $Ck_1$ for propagation to Oc. If the selected output phase changes sufficiently before the arrival of $Ck_1$ the DDPS acts as a frequency multiplier. The pulses at the Acc clock input change its digital output value according to the sequence $0.10_b$, $0.11_b$, $0.00_b$, $0.01_b$, and so on, selecting $Ck_2$, $Ck_3$, $Ck_0$, $Ck_1$, to be propagated to the output clock Oc. For another input phase number Ph=$0.11_b$ the output phase would follow the sequence $0.00_b$, $0.11_b$, $0.10_b$, $0.01_b$ and so on, giving an output period equal to three times the delay between $Ck_0$ and $Ck_1$.

The frequency of the output signal is given by $$fo_c = f_{Clk}/Ph,$$

where Ph<1 is the phase increment and $f_{Clk}$ is the frequency of any $Ck_i$ clock. Since Ph is less than 1, the output frequency is greater than the input clock frequency.

It is said by Calbaza et al. that a phase accumulator with a bit resolution larger than the number of bits required to address the inputs of the transition selector can express the output frequency with better precision. For instance, a 32-bit phase accumulator allows controlling the output clock frequency with sub-hertz precision. However, the time resolution of the output transitions and implicitly the output jitter, is determined by the time separation between the phases produced by the transition generator TGen.

The TSel selects one of the phases provided by TGen and propagates it to its output. Ideally, TSel propagates each phase with the same delay to avoid inducing jitter. Delay modulation can be included in the TSel circuit to improve the resolution of the DDPS. This reduces the theoretical jitter of the DDPS to a fraction of an inverter delay.

FIG. 9C is a block diagram of a possible implementation of the TSel circuit. Again, to simplify the illustration, only the two MSBs of the phase accumulator output control the TSel circuit. The next two LSBs of the phase accumulator output are used to control the propagation delay through the output buffer. The circuit comprises a programmable logic array decoder (PLA decoder), four resettable D flip-flops, an OR gate, and a buffer with a controlled propagation time. The PLA decoder receives the 2 MSBs ($PH_{MSB}$) of the phase accumulator and sets the D0-D3 lines according to the received code. The PLA was used for convenience, and it also occupies a small size, due to its regular layout structure, and produces a small delay since transistors are connected in parallel.

For instance, if $PH_{MSB}$=0.1, D1 will be at 1. Thus, $Ck_1$ is selected and when its rising edge arrives, the corresponding line becomes '1'. This '1' propagates through the OR gate, resetting all of the D flip-flops and generating a pulse to the output clock Oc. The pulse on Oc activates the phase accumulator, selecting a new phase to be propagated, as discussed above.

It is said by Calbaza et al. that it is important to equalize the propagation delays from the selected $Ck_i$ (i=0-3) to the output of the OR gate, since variations of this propagation delay cause jitter. Considering a 500-ps propagation delay, a 5% mismatch would produce about 25-ps period jitter.

It is also said by Calbaza et al. that the time resolution of TSel can be improved with a delay modulator that may be implemented with a buffer controlled by the 2 bits of the output phase of Acc ($PH_{LSB}$) that directly follow the set of MSBs used to control the PLA decoder. These two bits are said to modulate the propagation delay δ through the buffer as follows:

for $PH_{LSB}$='00' δ=100 ps for $PH_{LSB}$='01' δ=112.5 ps for $PH_{LSB}$='10' δ=125 ps for $PH_{LSB}$='11' δ=137.5 ps, and, therefore, the resolution provided by TSel is 12.5 Ps.

As was noted above, following the techniques disclosed by Calbaza et al. spurs in the output spectrum appear due to truncation of the phase accumulator output. However, in accordance with the exemplary embodiments of this invention sigma-delta modulation is used to suppress the spurs in the DDS output so as to improve its spectral purity and also facilitate subsequent filtering.

The use of a SDDM 30 in a TD-DDS implementation is shown in FIG. 3. In FIG. 3 the TD-DDS 14 includes a DTC block 26 and a digital block 28. The digital block 28 includes the SDDM 30 which takes 8 bits (shown as s[25:18]) of an output of a phase accumulator (Acc) 32. Bits s[25:18] directly follow the two bits (shown as s[27:26]) used to control, via register (Reg) 36 (which provides a one clock delay), a delay modulator (Dmod) 34. The input to the Acc 32 is a 32-bit digital control (dc) signal, which represents the control signals 20 shown in FIG. 2. The SDDM 30 output, Cdf, is included with the input of Dmod 34, which outputs a frequency signal $f_{fine}$. The Dmod 34 implementation accepts the additional Cdf input from the SDDM 30 as is shown in FIG. 4. It can be seen that each bit of the Cdf from the SDDM 30 output is used to switch a unit capacitance cell C, as do the two bits (Cd) from the Acc 32 via Reg 36. In principle, all of the unit capacitance (C) cells used for delay control in the Dmod 34 may be of the same size and thus account for the same associated delay. The end result is to controllably delay the $f_{mid}$ input signal that is generated from the reference frequency signal ($f_{ref}$) by a transition generator (Tgen) block 38 and by a transition selector (Tsel) block 40. The reference frequency signal may be the output 12A of the PLL 12 shown in FIG. 2. Note that the Tgen block 38 and the Tsel block 40 may be conventional in nature, such as those described above in relation to the Calbaza et al. publication. Also shown in FIG. 3 is a one-hot decoder 42, which is effectively the counterpart of the PLA decoder (FIG. 9C) in the DDPS circuit proposed by Calbaza et al. The one-hot decoder 42 is a circuit that converts binary code into one-hot code. The 16-bit output of the one-hot decoder 42 is applied to Tsel 40 to select one output thereof, and thus select the next transition time of $f_{mid}$. The $f_{mid}$ signal also clocks the SDDM 30, the Acc 32, the Reg 36 and the one-hot decoder 42.

Figure 5:
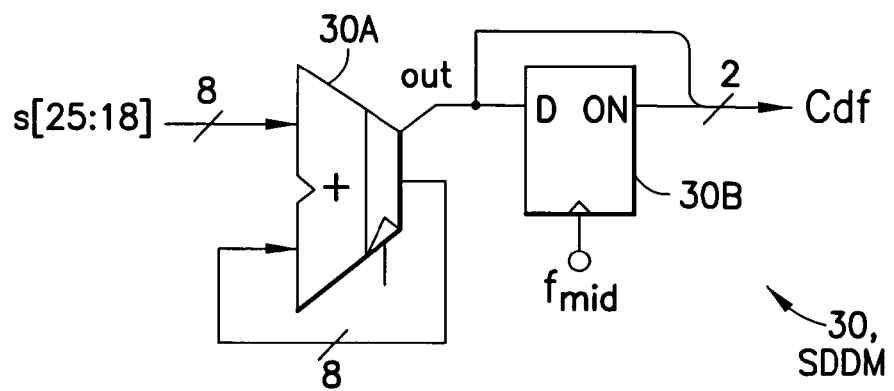
FIG. 5 depicts the internal structure of a (2nd-order) SDDM used in the TD-DDS shown in FIG. 3.

An exemplary hardware embodiment of the SDDM 30 is shown in FIG. 5. The SDDM 30 includes an 8-bit accumulator 30A followed by a d-flip-flop 30B clocked by $f_{mid}$. More specifically, the input s[25:18] is an 8-bit segment of the 32-bit output of the Acc 32. The input is taken as an unsigned binary word and is again accumulated in the SDDM 30 for every cycle of clock signal $f_{mid}$, generating an overflow signal Ovf. At the output the Ovf signal is delayed and combined with its non-delayed version to form a 2 bit unitary word Cdf. The result is that the SDDM input s[25:18] determines the occurrence of the overflow and the time series of the output Cdf. If we consider the bit Cd[0] (the least significant bit of the signal Cd) and Cdf as one unitary-weighted word, the time series of this word is equivalent to that of the output from a second order MASH-type SDM using dc[26:0] as its input. From another perspective, SDDM 30 can be understood as a second stage of a classical second-order MASH-type SDM, while the first stage of the SDM is implicitly given by the relevant part Acc 32.

As is known in the art, the second-order MASH SDM structure has a noise shaping property, and is used in digital audio and fractional-N frequency synthesizers. It comprises two or more cascaded overflowing accumulators, each of which is equivalent to a first-order SDM. The carry outputs are combined through summations and delays to produce a binary output, the width of which depends on the number of stages (order) of the MASH. In addition to its noise shaping function, the MASH structure also exhibits the features of a simple to implement hardware embodiment, as only digital blocks such as accumulators, adders, and D flip-flops are required, and unconditional stability (as there are no feedback loops outside the accumulators).

The unitary-weighted word (Cdf) along with the binary-weighted word (Cd) is used to switch the unit capacitors C of the Dmod 34 to produce a time-varying delay having a time-averaged value that directly corresponds to the binary value of dc[26:0], and produces an equivalent spectrum-shaping effect as a second-order MASH type of SDM.

Figure 6:
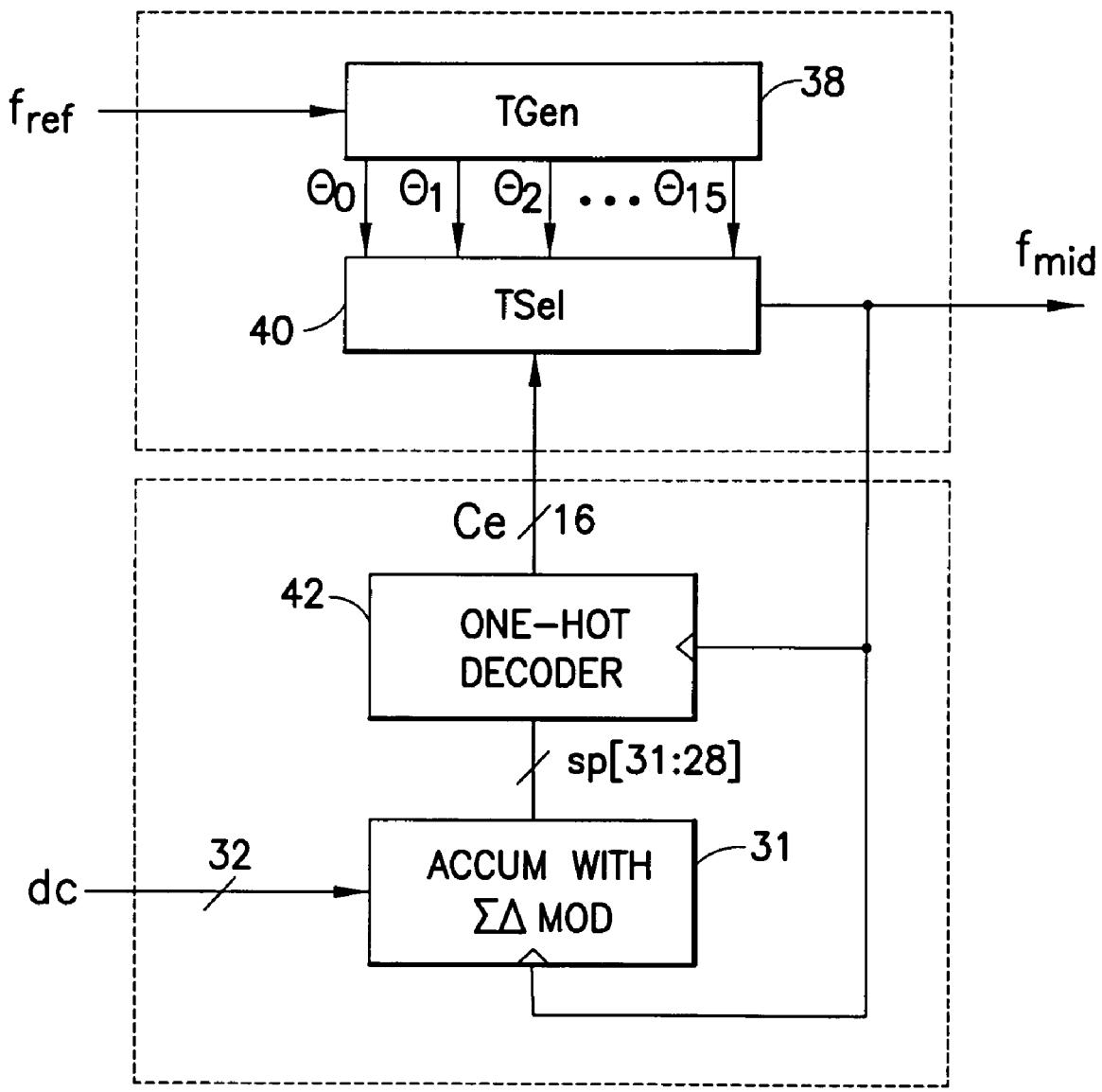
FIG. 6 is a block diagram of the TD-DDS with SDDM integrated in a phase accumulator.
Figure 7:
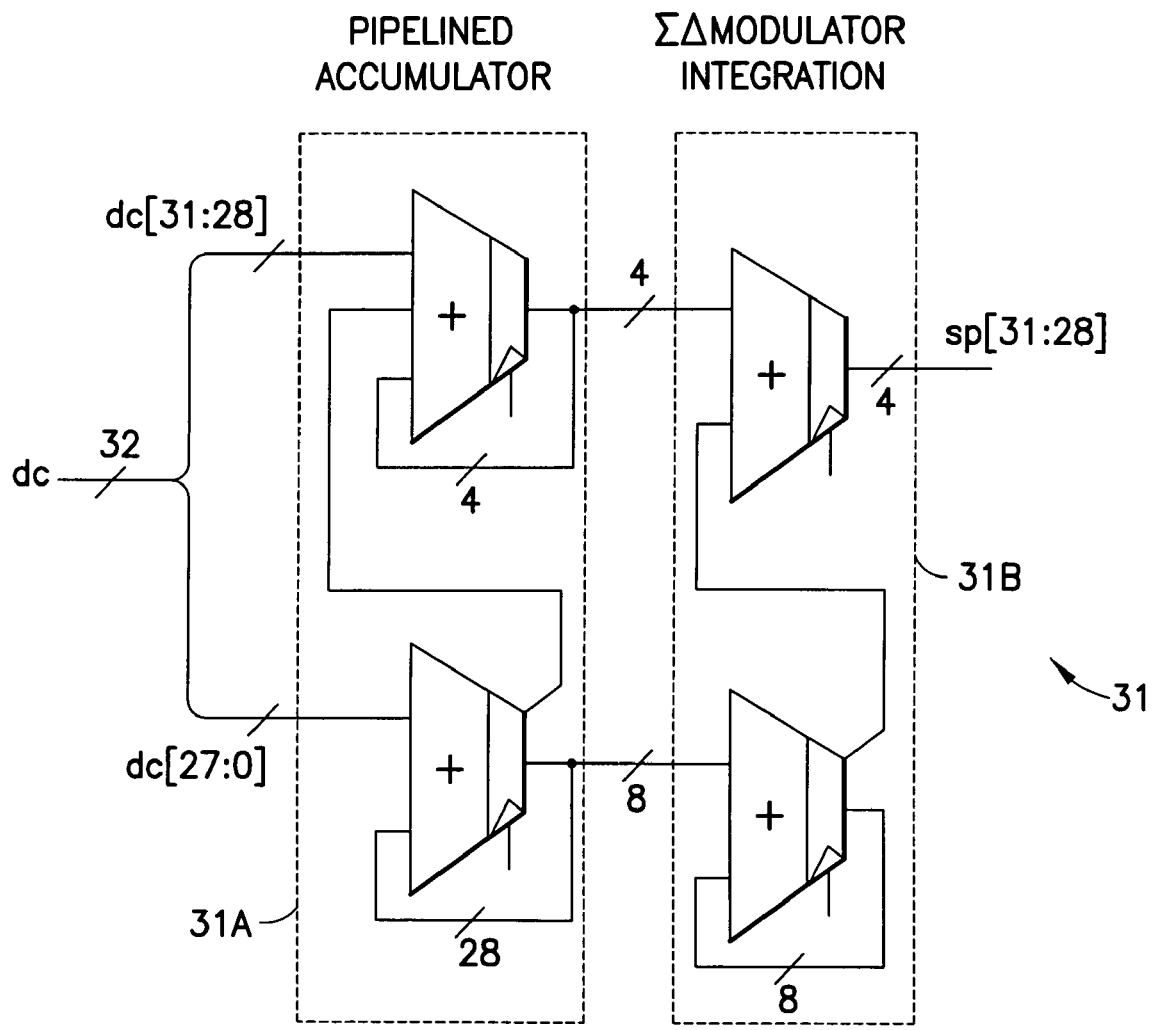
FIG. 7 shows the phase accumulator with integrated SDM.

In a case where it is desired to not use the Dmod 34, and the DTC 26 comprises only the transition generator (Tgen) 38 and the transition selector (Tsel) 40, another embodiment may be used in order to integrate the SDDM 30. In this case the output of the SDDM 30 is combined with that of the phase accumulator 32 before the decoding takes place, and thus a combination of the SDDM 30 with the phase accumulator 32 becomes a convenient choice, as shown as the block 31 in FIG. 6. One non-limiting embodiment of a hardware realization of the phase accumulator with second-order sigma-delta modulation is shown in FIG. 7, where the combined Acc/SDDM block 31 is shown to include a pipelined accumulator block 31A followed by a SDM integration block 31B. The 4-bit output sp[31:28] of the SDM integration block 31B provides the input to the one-hot decoder 42 of FIG. 6. Like the SDDM 30 in FIG. 3, the SDM integration block 31B shown in FIG. 7 effectively adds a second stage of a second-order MASH-type SDM, whose first stage is implicitly given in the accumulator 31A. The result is that it produces the same kind of spectrum shaping effect on the output signal $f_{mid}$.

Figure 8:
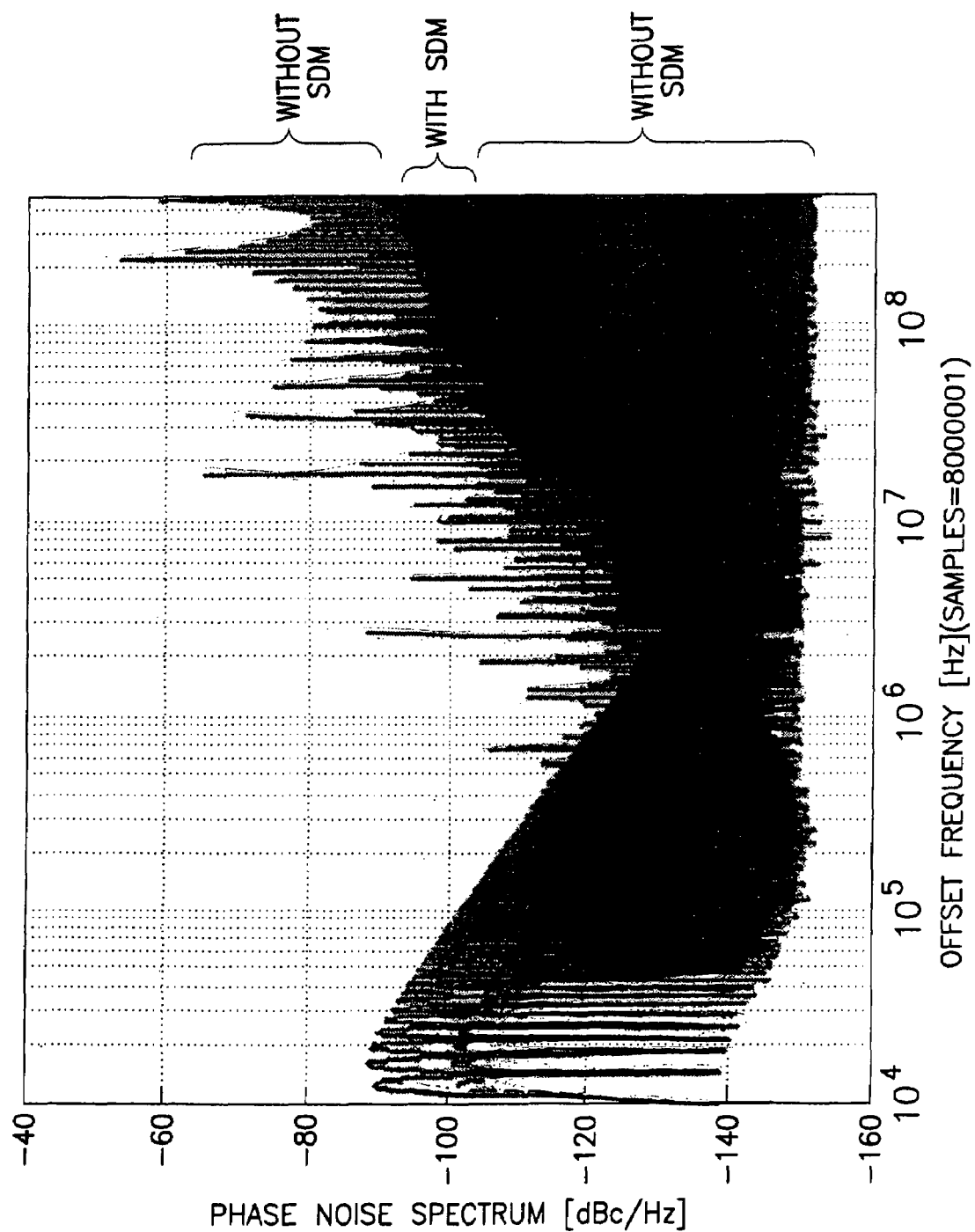
FIG. 8 depicts the result of a simulation of the TD-DDS output phase noise performance with and without the SDM.

One advantage and technical effect that is provided is the suppression of the spurious tones in the output spectrum of the TD-DDS 14, with low overhead in hardware complexity and power consumption. This advantage is clearly demonstrated with the simulation results as shown in FIG. 8.

Figure 1:
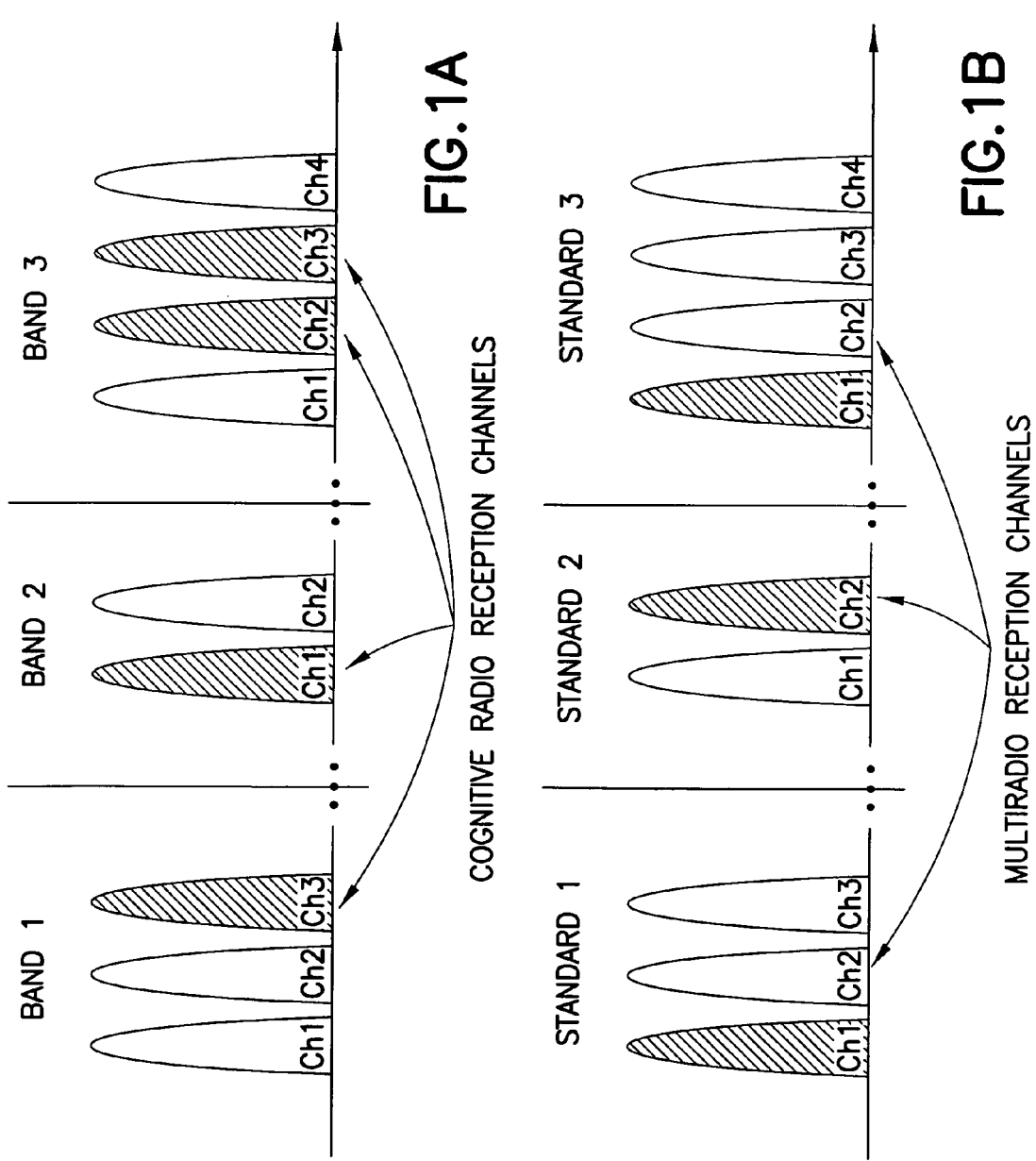
FIGS. 1A and 1B depict exemplary radio scenarios of multiple concurrent independent receptions in cognitive radio and multiradio systems, respectively.
Figure 10:
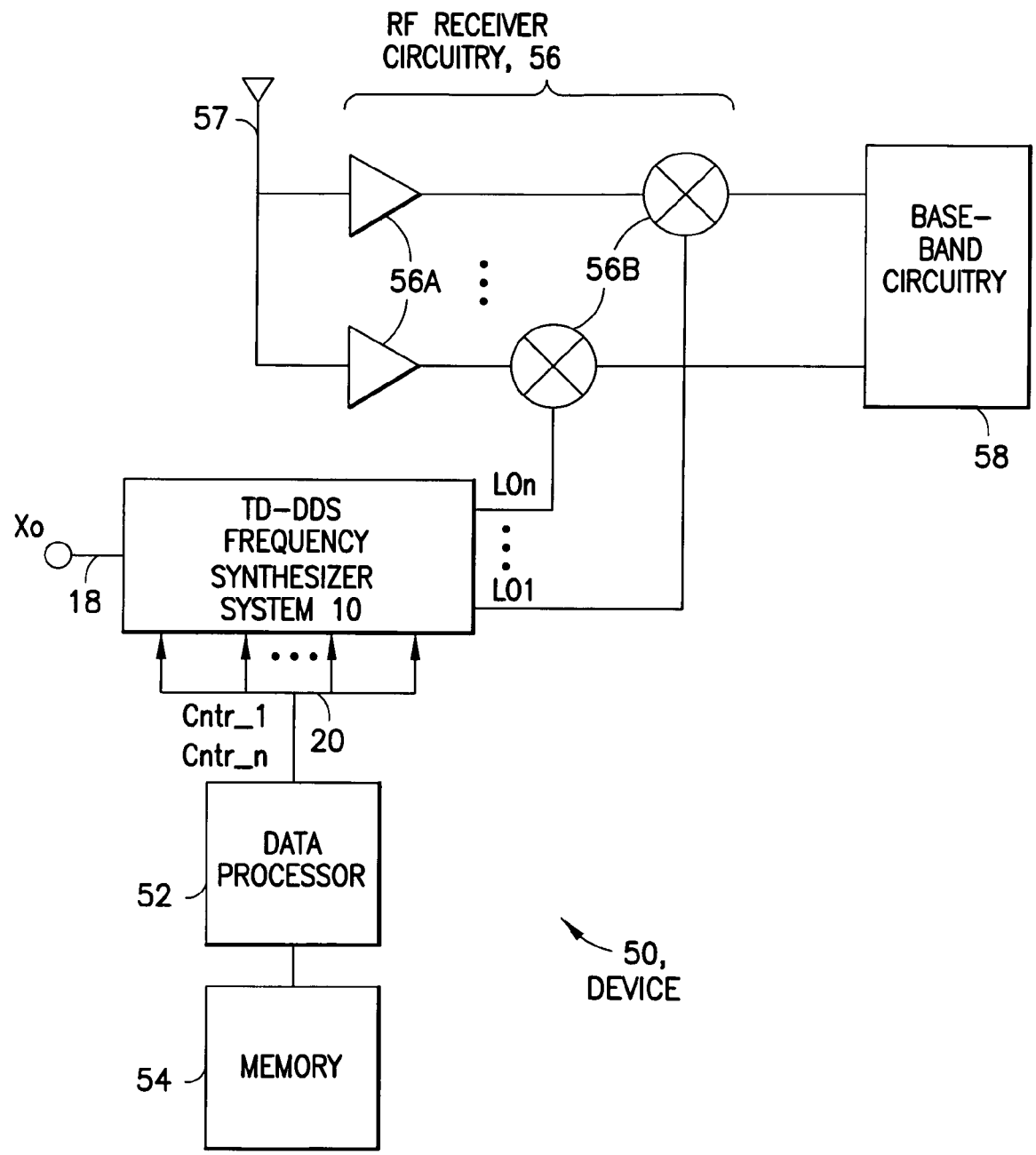
FIG. 10 is a simplified circuit diagram of a device that incorporates an instance of the TD-DDS described with respect to FIGS. 2-8.

FIG. 10 shows an exemplary device 50, such as a wireless communications device (e.g., a cognitive radio/multiradio device) that is constructed to include the TD-DDS frequency synthesizer system 10 as described above with reference to FIGS. 2-8. The device 50 includes at least one controller, such as at least one data processor 52 that operates in accordance with program instructions stored in at least one storage medium, such as at least one memory 54. The data processor 52 sources the control bus signals (cntr_1, . . . , cntr_n 20) to the TD-DDS frequency synthesizer system 10 for setting individual ones of the output frequencies of the TD-DDS units 14. These output frequencies form the LO signals that may be applied simultaneously to RF receiver circuitry 56. The RF receiver circuitry 56 may include multiple instances of receivers 56A and downconversion mixers 56B. The receivers 56A are configured to be connected with at least one, and possibly several antennas 57, and operate to simultaneously receive and downconvert multiple reception channels in multiple frequency bands (e.g., see FIG. 1). The RF receiver circuitry 56 may be implemented as a plurality of direct conversion receivers or as a plurality of superheterodyne-type receivers. In either case the downconverted signals from multiple reception channels are provided to at least one baseband circuitry block 58 to demodulate and decode received signaling and other data.

Note that the RF receiver circuitry 56 may be embodied as an integrated circuit, as may the baseband circuitry 58. The TD-DDS frequency synthesizer system 10 may be embodied as part of the RF receiver circuitry 56, or it may be embodied separately therefrom. In some embodiments all of the circuitry shown in FIG. 10, including the data processor 52 and possibly also the memory 54, may be embodied in one integrated circuit module or package.

Note further that in some embodiments all or some of the functionality of the TD-DDS frequency synthesizer system 10 may be embodied by the data processor 10 or by another data processor, such as a high speed digital signal processor operating under control of a stored program.

Note further that while shown in the context of a radio receiver, the exemplary embodiments may be used as well to provide local oscillator and other frequency signals for a radio frequency transmitter, such as upconversion local oscillator signals in a multi-transmitter type of device.

It should also be noted that the programmability of the individual ones of the TD-DDS units 14A facilitates their use in frequency hopped communication systems, as one non-limiting example.

Based on the foregoing it should be apparent that the exemplary embodiments of this invention provide a method, apparatus and computer program(s) to simultaneously generate a plurality of independent frequency signals that may be used as a plurality of local oscillator signals in a radio receiver and/or a radio transmitter.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams or by using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of cognitive radio and multi-radio applications, it should be appreciated that the exemplary embodiments of this invention are not limited for use with only these particular types of wireless communication systems, and that they may be used to advantage in other types of wireless communication systems, as well as in other types of radio wave based systems, such as television systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters and circuit elements are not intended to be limiting in any respect, as these parameters and circuit elements may be identified by any suitable names. Further, any formulas and/or expressions that use these various parameters may differ from those expressly disclosed herein. Still further, any description above related to specific numbers of bits, word widths, bit positions within a word and the like are meant to be merely examples, and are not to be construed in a limiting sense upon the implementation and use of the exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. An apparatus, comprising:
    a frequency source; and
    a plurality of time domain direct digital synthesizers each having an input connected to an output of said frequency source and an output providing an output frequency signal,
    where each of the plurality of time domain direct digital synthesizers comprises at least a second order sigma-delta modulator and
    where a time domain direct digital synthesizer is a delay locked loop based synthesizer.

2. The apparatus of claim 1, where each of the plurality of time domain direct digital synthesizers is connectable with a plurality of control signals to specify the frequency value of the output frequency signal.

3. The apparatus as in claim 2, where each time domain direct digital synthesizer comprises:
    a digital-to-time converter comprising a transition generator having an input connected with said output of said frequency source and a plurality of outputs, a transition selector connected with said plurality of outputs of said transition generator configured to select one generated transition of said output of said frequency source, said transition selector having an output providing a first frequency signal, and a delay modulator having an input connected to said output of said transition selector configured to controllably delay said first frequency signal and having an output providing a final output frequency signal, and
    a digital block comprising a phase accumulator having a plurality of inputs connected with said plurality of control signals and a plurality of outputs, a decoder having an input coupled to some of said plurality of outputs of said phase accumulator and an output connected with said transition selector configured to select the selected one generated transition, and further comprising the sigma-delta modulator having a plurality of inputs connected to others of said plurality of phase accumulator outputs and a plurality of outputs connected, in combination with still others of said plurality of phase accumulator outputs, to said delay modulator configured to specify an amount of delay experienced by said final output frequency signal.

4. The apparatus of claim 3, where said first frequency signal is connected as a clock signal to said decoder, to said phase accumulator, and to said sigma-delta modulator.

5. The apparatus of claim 4, further comprising a register interposed between said phase accumulator and said delay modulator configured to store said still others of said plurality of phase accumulator outputs, and
    where said first frequency signal is also connected as a clock signal to said register.

6. The apparatus as in claim 2, where each time domain direct digital synthesizer comprises:
    a digital-to-time converter comprising a transition generator having an input connected with said output of said frequency source and a plurality of outputs, and a transition selector connected with said plurality of outputs of said transition generator configured to select one generated transition of said output of said frequency source, said transition selector having an output providing a final output frequency signal, and a digital block comprising a phase accumulator having a plurality of inputs connected with said plurality of control signals and a plurality of outputs, the sigma-delta modulator having a plurality of inputs connected to said plurality of outputs of said phase accumulator and a plurality of outputs, and a decoder having an input connected to said plurality of outputs of said sigma-delta modulator and an output connected with said transition selector configured to specify the selected one generated transition.

7. The apparatus of claim 6, where said final output frequency signal is connected as a clock signal to said decoder, to said phase accumulator, and to said sigma-delta modulator.

8. The apparatus as in claim 3, where said sigma-delta modulator functions as a second order multi-stage noise shaping sigma-delta modulator.

9. The apparatus as in claim 3, where said sigma-delta modulator functions as a second order multi-stage noise shaping sigma-delta modulator, and
where said sigma-delta modulator outputs provide a unitary-weighted word used to switch certain unit capacitors that comprise part of said delay modulator to produce a time-varying delay having a time-averaged value that directly corresponds to a binary value appearing on said others of said plurality of phase accumulator outputs.

10. The apparatus as in claim 3, where said decoder comprises a one-hot decoder.

11. The apparatus as in claim 3, where at least one of said plurality of time domain direct digital synthesizers further comprises a frequency converter unit coupled to said final output frequency signal configured to modify said final output frequency signal to provide said output frequency signal.

12. The apparatus as in claim 11, where modifying comprises one of dividing or multiplying.

13. The apparatus as in claim 1, further comprising a radio frequency device configured to use individual ones of the plurality of output frequency signals as local oscillator signals in simultaneously downconverting a plurality of received signals.

14. The apparatus as in claim 1, further comprising a radio frequency device configured to use individual ones of the plurality of output frequency signals as local oscillator signals in simultaneously upconverting a plurality of signals to be transmitted.

15. The apparatus as in claim 1, embodied at least partially in at least one integrated circuit.

16. An apparatus, comprising:
a transition generator having an input configured to receive an output of a frequency source and a plurality of outputs;
a transition selector connected with said plurality of outputs of said transition generator configured to select one generated transition of said output of said frequency source, said transition selector having an output providing a first frequency signal;
a delay modulator having an input connected to said output of said transition selector configured to controllably delay said first frequency signal and having an output providing a final output frequency signal;
a phase accumulator having a plurality of inputs configured to receive a plurality of control signals and a plurality of outputs;
a decoder having an input coupled to some of said plurality of outputs of said phase accumulator and an output connected with said transition selector configured to select the selected one generated transition; and
a sigma-delta modulator having a plurality of inputs connected to others of said plurality of phase accumulator outputs and a plurality of outputs connected, in combination with still others of said plurality of phase accumulator outputs, to said delay modulator configured to specify an amount of delay experienced by said final output signal.

17. The apparatus of claim 16, where said first frequency signal is connected as a clock signal to said decoder, to said phase accumulator, to said sigma-delta modulator, and to a register interposed between said phase accumulator and said delay modulator.

18. The apparatus as in claim 16, where said sigma-delta modulator functions as a second order multi-stage noise shaping sigma-delta modulator.

19. The apparatus as in claim 18, where said sigma-delta modulator outputs provide a unitary-weighted word used to switch certain unit capacitors that comprise part of the delay modulator to produce a time-varying delay having a time-averaged value that directly corresponds to a binary value appearing on said others of said plurality of phase accumulator outputs.

20. The apparatus as in claim 16, where said decoder comprises a one-hot decoder.

21. The apparatus as in claim 16, further comprising a frequency converter unit coupled to said final output frequency signal configured to modify said final output frequency signal to provide said output frequency signal.

22. The apparatus as in claim 21, where modifying comprises one of dividing or multiplying.

23. An apparatus, comprising:
a transition generator having an input configured to receive an output of a frequency source and a plurality of outputs;
a transition selector connected with said plurality of outputs of said transition generator configured to select one generated transition of said output of said frequency source, said transition selector having an output providing a final frequency signal;
a phase accumulator having a plurality of inputs configured to receive a plurality of control signals and a plurality of outputs;
a sigma-delta modulator having a plurality of inputs connected to said plurality of outputs of said phase accumulator and a plurality of outputs;
a decoder having an input connected to said plurality of outputs of said sigma-delta modulator and an output connected with said transition selector configured to specify the selected one generated transition.

24. The apparatus of claim 23, where said final output frequency signal is connected as a clock signal to said decoder, to said phase accumulator, and to said sigma-delta modulator.

25. The apparatus as in claim 23, where said sigma-delta modulator functions as a second order multi-stage noise shaping sigma-delta modulator.

26. The apparatus as in claim 23, where said decoder comprises a one-hot decoder.

27. The apparatus as in claim 23, further comprising a frequency converter unit coupled to said final output frequency signal configured to modify said final output frequency signal to provide said output frequency signal.

28. The apparatus as in claim 27, where modifying comprises one of dividing or multiplying.

29. A method, comprising:
simultaneously generating from a single reference signal a plurality of local oscillator signals with a corresponding plurality of time domain direct digital synthesizers,
where a time domain direct digital synthesizer is a delay locked loop based synthesizer and where each of the plurality of time domain direct digital synthesizers comprises at least a second order sigma-delta modulator; and
using individual ones of said plurality of local oscillator signals for at least one of simultaneously downconverting and upconverting a plurality of frequency signals.

30. The method of claim 29, where simultaneously generating comprises suppressing spurs in each of the plurality of local oscillator signals by operating, in each of said plurality of time domain direct digital synthesizers, the sigma-delta modulator.

31. The method of claim 29, where simultaneously generating comprises suppressing spurs in each of the plurality of local oscillator signals by operating, in each of said plurality of time domain direct digital synthesizers, the sigma-delta modulator.

32. The method of claim 29, performed in a wireless communication device.

33. The method of claim 29, performed at least in part by execution of computer program instructions by a controller of a wireless communication device.

34. An apparatus, comprising:
means for simultaneously generating from a single reference signal a plurality of local oscillator signals with a corresponding plurality of time domain direct digital synthesizers each comprising a second order multi-stage noise shaping sigma-delta modulator,
where a time domain direct digital synthesizer is a delay locked loop based synthesizer; and
means for mixing individual ones of said plurality of local oscillator signals for at least one of simultaneously downconverting and upconverting a plurality of frequency signals.

35. The apparatus of claim 34, embodied in at least one integrated circuit.

* * * * *